Figure 1:
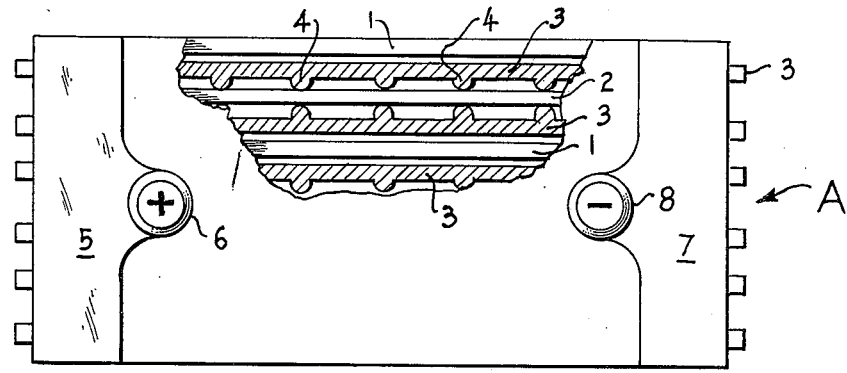

June 5, 1962     E. G. TIEGEL     3,038,018
MEANS FOR AND METHOD OF MAKING DRY-CHARGE BATTERIES
Filed Aug. 2, 1954     3 Sheets-Sheet 1

INVENTOR.
Ernest George Tiegel
BY
A. Schapp
ATTORNEY

June 5, 1962   E. G. TIEGEL   3,038,018
MEANS FOR AND METHOD OF MAKING DRY-CHARGE BATTERIES
Filed Aug. 2, 1954   3 Sheets-Sheet 2

INVENTOR.
Ernest George Tiegel
BY  A. Schapp
ATTORNEY

June 5, 1962 E. G. TIEGEL 3,038,018
MEANS FOR AND METHOD OF MAKING DRY-CHARGE BATTERIES
Filed Aug. 2, 1954 3 Sheets-Sheet 3

INVENTOR.
Ernest George Tiegel
BY
A. Schapp
ATTORNEY

United States Patent Office 3,038,018
Patented June 5, 1962

3,038,018
MEANS FOR AND METHOD OF MAKING
DRY-CHARGE BATTERIES
Ernest George Tiegel, Redwood City, Calif.
(Bragato Road, Belmont, Calif.)
Filed Aug. 2, 1954, Ser. No. 447,264
4 Claims. (Cl. 136—33)

The present invention relates to improvements in a means for and method of making dry-charge batteries, and its principal object is to greatly simplify the washing and drying of previously charged battery plate assemblies.

It has been found advantageous to place common storage batteries on the market in dry form, with the plates fully charged, but with the electrolyte removed so as to substantially prevent chemical action until the battery is sold for actual use, at which time the electrolyte is added to complete the battery.

Heretofore, two different methods have been used for making dry-charge batteries:

(1) The positive plates and the negative plates are mounted in tanks and are charged individually. After the plates are charged, they are washed, dried in steam or in neutral atmosphere and assembled into batteries. These batteries are sealed and are considered dry-charge batteries.

(2) The other method consists of making a standard battery and, after charging the battery, taking it completely apart again, separating the positive groups from the negative groups. Then the groups are washed in water to remove any residual acid and the groups are dried, either in a neutral atmosphere or in steam. Thereafter the positive and negative groups are nested together again and assembled into batteries, with separators arranged between the plates.

The disadvantage of the first method is the individual handling of the plates, requiring the individual mounting of the plates in a tank, individual connection of each plate into the charging line and the separation of the individual plates from the charging line.

The disadvantage of the second method is that after a complete cell has been built and charged, it has to be taken apart again for the washing and drying operations and has to be re-insulated.

In the present invention, it is proposed to provide a method whereby the entire charged battery unit, including positive plates, negative plates and separators may be washed and dried without disassembling the unit.

Further objects and advantages of my invention will be disclosed as the specification continues, and the new and useful features of the same will be fully defined in the claims attached hereto.

Figure 2:
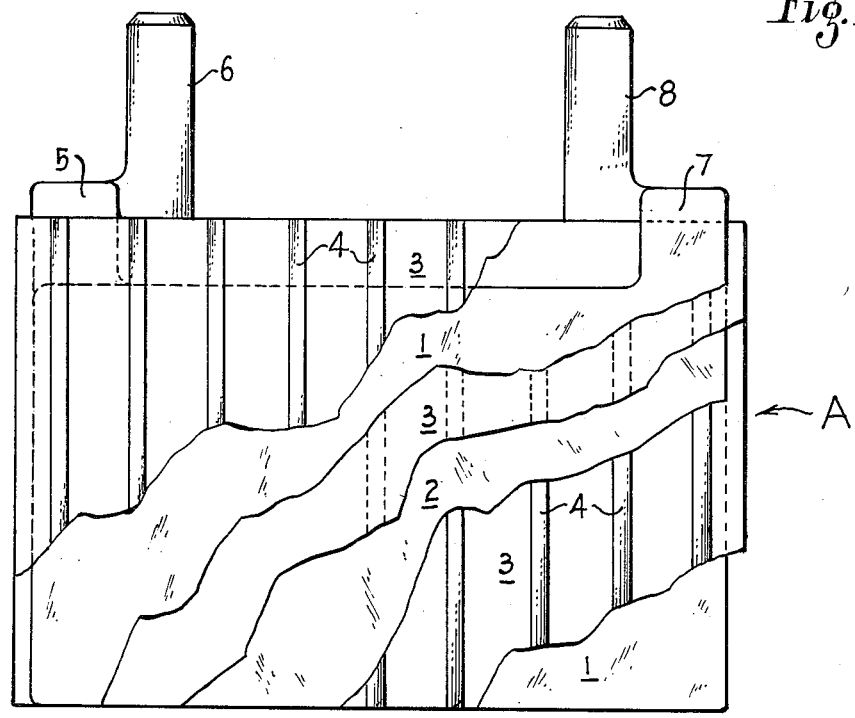
Figure 3:
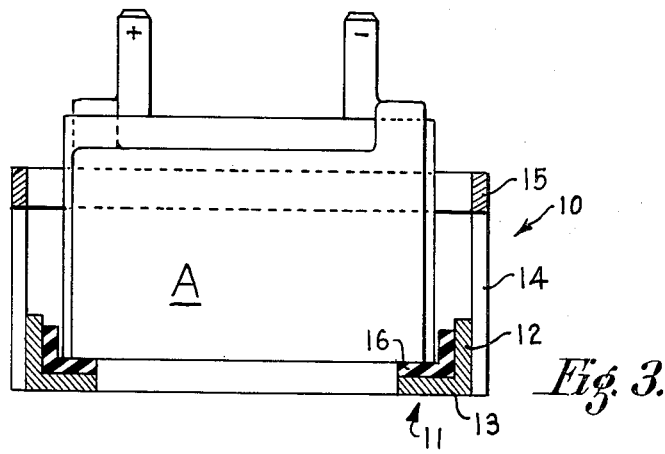
Figure 4:
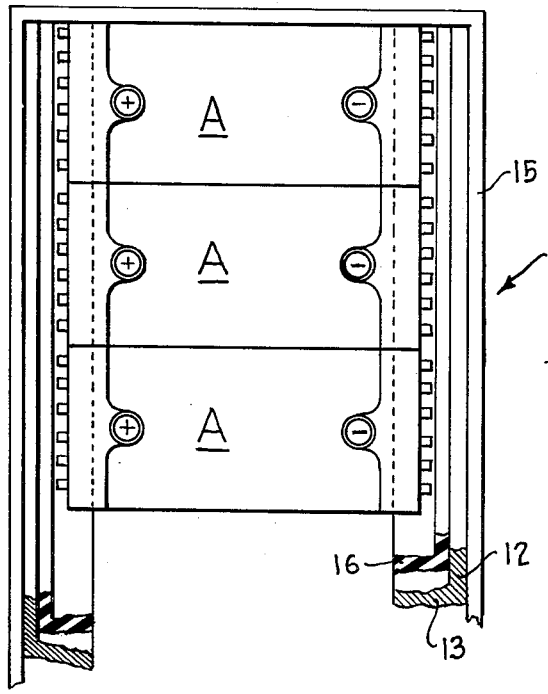
Figure 5:
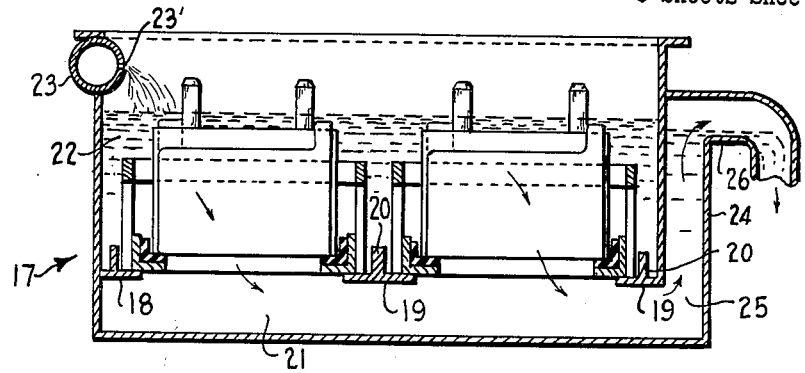
Figure 6:
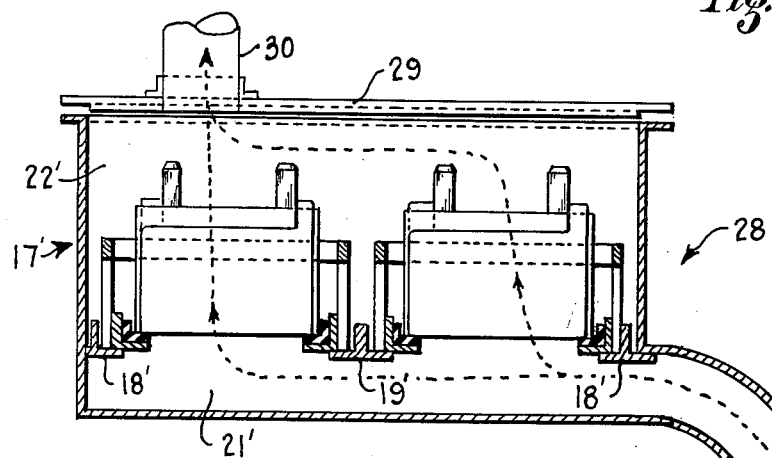
Figure 6:
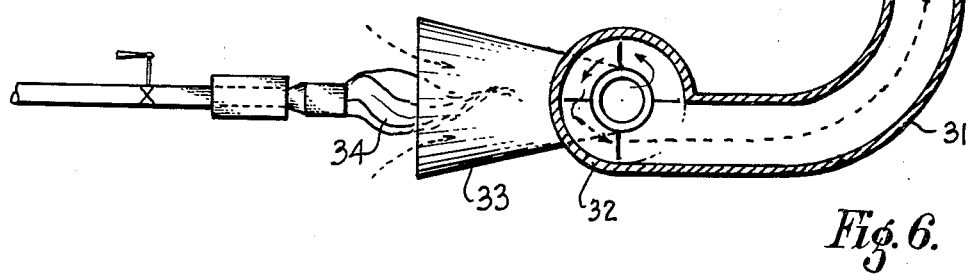

The preferred form of my method is explained with the aid of the accompanying drawing, forming part of this application, in which:

FIGURE 1 shows a plan view of a complete battery unit, ready for a washing operation, with portions broken away;

FIGURE 2, a side view of the same, with portions broken away;

FIGURE 3, a transverse section through a rack having the unit supported therein;

FIGURE 4, a plan view of the rack, with units accommodated therein;

FIGURE 5, a vertical section through a washing tank having racks and units arranged therein; and FIGURE 6, a similar section through a drying tank having racks and units arranged therein.

While I have shown only the preferred form of my invention, it should be understood that various changes or modifications may be made within the scope of the claims attached hereto, without departing from the spirit of the invention.

Referring to the drawings in detail, FIGURES 1 and 2 show a complete battery unit A comprising negative plates 1 and positive plates 2 and separators 3 arranged in alternating succession, beginning at each side, with a negative plate.

The first negative plate is followed by the separator 3 which has a series of ridges 4, with intervening grooves, facing the next plate, which is positive. Next comes a second separator, the ridges and grooves of which also face a positive plate, and this separator is also followed by a negative plate, etc.

The positive plates are interconnected by a strap 5 running along one end of the unit and terminating in a vertical post 6; and the negative plates are also interconnected by a strap 7 running along the opposite end of the unit and terminating in a vertical post 8. The separators are usually somewhat wider than the plates and project beyond the ends thereof, as shown in FIGURE 1.

The entire unit is sufficiently integrated for convenient handling as a unit, but is sufficiently loose in structure to allow the electrolyte to contact both faces of each plate.

Of particular importance for the purposes of the present invention are the grooves in the separators which are taken advantage of in my process for the purpose of causing the cleaning agent or the drying agent to pass right through the unit in parallel paths and to entrain acid or liquid, as the case may be, from every portion of the unit.

Assuming that the unit shown in FIGURES 1 and 2 has been previously charged in an electrolyte, and has been lifted out of its bath and has been partly dried by allowing the electrolyte to run off, it will then be necessary to wash all the acid from the unit and to thereafter thoroughly dry the entire unit.

This cannot be done effectively by merely immersing the complete unit in water and then drying in a neutral atmosphere, or in a steam bath, because the process would be too slow and would not guarantee the removal of all of the acid in the washing operation nor the absolute drying of all parts of the assembly in the drying operation.

In accordance with my new method, the entire unit, after having been properly assembled, is first charged in the usual manner, that is by placing the unit into a suitable container, connecting the plate groups into a direct current circuit, adding the electrolyte, and allowing sufficient time for the charging.

After the unit is fully charged, it is disconnected, pulled out of the sulfuric acid and placed in a rack 10, such as shown in FIGURES 3 and 4, the rack being adapted to accommodate a number of units in side-by-side relation, as shown in FIGURE 4.

The rack 10 is of open construction, and comprises a pair of spaced and parallel runners 11, these runners being spaced with respect to the battery unit width, as shown, so as to allow the extreme edges of the unit to rest thereon. The runners are in the shape of angle irons, presenting vertical flanges 12 and horizontal flanges 13 projecting toward one another.

The vertical flanges have bars 14 projecting upwardly therefrom, and the upper ends of the bars are interconnected by a horizontal, rectangular frame 15. The height of the rack is somewhat less than the height of the unit, as shown. It's length is such as to accommodate a desired number of units, preferably fifteen.

The runners are preferably covered by a rubber strip 16 cemented thereto to protect the edges of the plates and the separators.

The rack 10 is intended to be used in connection with a tank 17 shown in FIGURE 5, which, in the preferred form, is made to accommodate two or more racks in side-by-side relation. It is rectangular in form and of an inside length substantially co-extensive with the length of the rack, and of a width slightly in excess of the width of the rack or a multiple thereof. The height of the tank is considerably in excess of the height of the units.

The tank has means for supporting the racks intermediate the height thereof, the supporting means being arranged to form a seal outside the assembled units.

The supporting means comprises, in the form shown, where two racks are to be accommodated, a pair of horizontal flanges 18 projecting inwardly from the side walls of the tank to allow the outer edges of the racks to rest thereon and a central flange 19 for supporting the inner edges of the racks. The horizontal flanges may be reinforced by suitable vertical flanges 20 which also serve as positioning means for the racks.

The flanges 18 and 19 are suitably spaced from the bottom of the tank, to form, with the superimposed racks and battery units, a lower chamber 21 which communicates with the upper chamber, indicated at 22, only through the grooves in the separators, which are disposed vertically.

The tank may be filled with water or other washing agent before the racks with the battery units are inserted, and water is added through a pipe 23 running alongside of an upper side edge of the tank, the pipe having discharge holes 23'.

The tank is provided with an overflow 24 communicating with the lower chamber as at 25 and having an overflow edge 26 approximately on a level with the upper edges of the battery units. The water in the tank is maintained at a level slightly higher than the overflow edge, so that water is continuously forced through the separator grooves toward the overflow for discharge thereover.

The water thus passing through the grooves entrains any acid present in the battery units and discharges the same through the overflow. The operation may take approximately thirty minutes, and is completed when the overflow shows no traces of acid.

It is perfectly feasible, of course, to reverse the flow of the water, causing the latter to enter under pressure in the lower compartment, pass upwardly through the battery units and discharge over an edge disposed in the upper compartment above the battery units.

After the units have thus been washed and removed from the tank, it is advisable to dip the racks with their units into a water tank containing a wetting agent, so that after the units have been dried and assembled into commercial charged dry batteries, and it becomes necessary to re-introduce the sulfuric acid, the plates and separators will absorb the acid very rapidly and will render service immediately after filling.

After completion of the washing and wetting operations, the assembled racks and battery units are inserted into the drier 28 illustrated in FIGURE 6. This drier is constructed in the same manner as the washing tank and comprises a tank 17' having the flanges 18' and 19' mounted therein for receiving the racks, and providing a lower chamber 21' and an upper chamber 22'. The tank is covered with a removable top 29 having a vent 30.

A drying agent, such as air heated in the presence of combustion gases is forced through the tank and the separator grooves from below by means of a conduit 31 having a blower 32 therein which draws on a Venturi tube 33, which in turn draws on a gas flame 34 and on outside air.

The heated air is forced to pass through the grooves in the battery separators for final discharge through the vent 30, and entrains any moisture present in the battery unit. This process consumes approximately from thirty minutes to one hour.

It is apparent that in this case, the draft may be directed through the units in the opposite direction by a reversal of the circuit.

While the washing rack and the drying tank have here been shown, for the sake of clarity, as two independent structures, it should be noted that they might readily be combined into a single structure, as by applying the air circuit of FIGURE 6 to the tank of FIGURE 5, with suitable valve controls for rendering either system active or inactive, as desired.

As an alternative to the use of the blower and air heated by the gases of combustion, live steam could be used to dry the elements, in which case a steam pipe would be connected to the lower compartment to blow super-heated steam of about 270° F. through the units.

As a further alternative, a heated inert gas, which does not react with the charged negative plates, might be used as a drying agent.

The charged negative plates have a tendency of burning up if they are exposed to atmospheric air in a damp condition. For this reason the use of super-heated steam or hot inert gases would appear to be preferable.

The tendency may also be counteracted by adding an inhibitor to the negative plates, which prevents oxidation of the sponge lead while it is in a damp state, as for instance, by using a product known as "National Lead Dry-ox" in making the negative plates.

It is feasible to carry out the washing process and drying operations in a continuous process by securing the racks upon a conveyor chain and leading them successively through the washing and the drying tanks while applying circulation through the separator grooves as hereinabove described.

The principle of my invention might also be employed for combining the charging, washing, and drying operations into a single continuous operation by mounting the racks on a conveyor and causing them to successively pass through a tank containing an electrolyte, with the plates connected to a direct current supply, and thereafter through the washing tank, with a wetting agent incorporated in the water, and then through the drying tank.

While my invention was particularly developed for use in connection with battery units using grooved separators, with the grooves forming a convenient path for the fluid, it is apparent that the principles of the invention may be readily used in connection with any battery unit so constructed as to allow of a relatively free flow of the fluid between the plates thereof.

I claim:

1. The method of treating a previously charged, complete battery unit having grooved separators, which comprises the steps of successively forcing a washing agent and a drying agent through the grooves of the separators with the unit submerged in said agents.

2. The method of washing a charged battery unit having a series of positive plates, a series of negative plates and longitudinally grooved separators between the plates, which comprises the step of forcing a fluid through the unit longitudinally, with the unit submerged in the fluid and the grooves serving as passageway for the fluid.

3. The method of washing a charged battery unit having a series of positive plates, a series of negative plates and longitudinally grooved separators between the plates, which comprises the step of forcing a liquid through the unit longitudinally, with the unit submerged in the liquid and the grooves serving as passageways for the liquid.

4. The method of washing a charged battery unit having a series of positive plates, a series of negative plates and longitudinally grooved separators between the plates, which comprises submerging the unit in a body of liquid in elevated position and with the grooves presented vertically, feeding a liquid to the body above the unit and drawing liquid from below unit, and confining the liquid to pass vertically through the grooves in the separators.

References Cited in the file of this patent

UNITED STATES PATENTS

| | | |
|---|---|---|
| 1,258,265 | Sokal | Mar. 5, 1918 |
| 1,478,708 | Gasche | Dec. 25, 1923 |
| 1,507,076 | Luhrman | Sept. 2, 1924 |
| 1,722,210 | Grimditch | July 23, 1929 |
| 2,681,377 | Smithers | June 15, 1954 |
| 2,747,008 | Sundberg et al. | May 22, 1956 |